US012687670B2

(12) United States Patent
Fei

(10) Patent No.: US 12,687,670 B2
(45) Date of Patent: Jul. 21, 2026

(54) INFRARED AUTOMATIC SWITCHING LIGHT FILTER WITH WIRELESS POWER SUPPLY

(71) Applicant: SHEN ZHEN FUNDER ELECTRONICS LTD, Shenzhen (CN)

(72) Inventor: Fei Fei, Shenzhen (CN)

(73) Assignee: SHEN ZHEN FUNDER ELECTRONICS LTD, Shenzhen (CN)

( * ) Notice: Subject to any disclaimer, the term of this patent is extended or adjusted under 35 U.S.C. 154(b) by 294 days.

(21) Appl. No.: 18/663,543

(22) Filed: May 14, 2024

(65) Prior Publication Data

US 2025/0321367 A1 Oct. 16, 2025

(30) Foreign Application Priority Data

Apr. 11, 2024 (CN) .......................... 202420774731.0

(51) Int. Cl.
G02B 5/20 (2006.01)
G02B 7/00 (2021.01)
(52) U.S. Cl.
CPC ............. G02B 5/208 (2013.01); G02B 7/006 (2013.01)

(58) Field of Classification Search
None
See application file for complete search history.

(56) References Cited

U.S. PATENT DOCUMENTS

2023/0025519 A1* 1/2023 Tseng ..................... G02B 7/006

* cited by examiner

*Primary Examiner* — Mark T Monk
(74) *Attorney, Agent, or Firm* — Westbridge IP LLC

(57) ABSTRACT

An infrared automatic switching light filter with wireless power supply includes: a housing; a light filter carrier plate slidably provided in the housing; and a driving mechanism configured to drive the light filter carrier plate to slide. The electromagnetic power mechanism includes a bracket; a coil is wound around outside the bracket along an axial direction of the bracket; the bracket is provided with conductive elastic pieces respectively connected to both ends of the coil; end portions of the conductive elastic piece are respectively provided with protrusion in contact with and connected to an external power supply apparatus; the electromagnetic power mechanism further includes a U-shaped magnetic conductive member penetrated through the bracket; and the transmission mechanism includes a rotary magnetic member provided between two ends of the U-shaped magnetic conductive member.

10 Claims, 5 Drawing Sheets

INFRARED AUTOMATIC SWITCHING LIGHT FILTER WITH WIRELESS POWER SUPPLY

CROSS-REFERENCE TO RELATED APPLICATIONS

The present application claims priority to Chinese Patent Application No. 202420774731.0, filed on Apr. 11, 2024, the entire contents of which are incorporated herein by reference.

TECHNICAL FIELD

The present application relates to the technical field of light filters, and in particular to an infrared automatic switching light filter with wireless power supply.

BACKGROUND

The light filter piece switch is usually arranged into the camera to meet better lighting requirements. The light filter piece switch contains two light filter pieces with different light transmittances, which are suitable for different lighting conditions. The current power supply method of the existing traditional infrared automatic switching light filter with wireless power supply is to connect the power cord in series with the internal coil, which will inevitably cause false soldering, fake soldering or loosening of the power cord terminal when the internal coil is connected in series with the power cord, resulting in poor contact, and the filter cannot be used normally.

SUMMARY

The main purpose of the present application is to provide an infrared automatic switching light filter with wireless power supply, aiming to solve the problem that the existing light filter power supply method is prone to poor contact.

In order to achieve the above purpose, the present application provides an infrared automatic switching light filter with wireless power supply, including:

a housing;

a light filter carrier plate slidably provided in the housing, where at least two light filter pieces are provided on the light filter carrier plate along a sliding direction of the light filter carrier plate; and a driving mechanism configured to drive the light filter carrier plate to slide, where the driving mechanism includes an electromagnetic power mechanism and a transmission mechanism.

The electromagnetic power mechanism includes a bracket; a coil is wound around outside the bracket along an axial direction of the bracket; the bracket is provided with conductive elastic pieces respectively connected to both ends of the coil; end portions of the conductive elastic piece are respectively provided with protrusion in contact with and connected to an external power supply apparatus; the electromagnetic power mechanism further includes a U-shaped magnetic conductive member penetrated through the bracket.

The transmission mechanism includes a rotary magnetic member provided between two ends of the U-shaped magnetic conductive member, and the transmission mechanism further includes a swing arm; one end of the swing arm is connected to the rotary magnetic member, and the other end of the swing arm is connected to the light filter carrier plate.

In an embodiment, the U-shaped magnetic conductive member includes a first arm and a second arm; the bracket is provided with a through hole for the first arm or the second arm to pass through; and a clamping slot is provided outside the bracket and configured to tightly clamp the U-shaped magnetic conductive member.

In an embodiment, a plurality of clamping buckles clamped with the first arm and the second arm are provided in the housing.

In an embodiment, the rotary magnetic member is a cylindrical magnet provided between an end portion of the first arm and an end portion of the second arm; and an inner side of the end portion of the first arm and an inner side of the end portion of the second arm are arc surfaces adapted to an outside of the cylindrical magnet.

In an embodiment, a fixed shaft is provided in the housing, and an axis center of the cylindrical magnet is inserted into the fixed shaft; and the cylindrical magnet is configured to rotate around the fixed shaft.

In an embodiment, one end of the swing arm is provided with an inserting portion inserted into the axis center of the cylindrical magnet, and the inserting portion is in a cylindrical structure; and a semicircular bump is provided outside the inserting portion.

In an embodiment, the other end of the swing arm is provided with a hinge portion hinged to the light filter carrier plate; the light filter carrier plate is provided with an elliptical groove, and the hinge portion is provided with an inserting shaft inserted into the elliptical groove; and an end portion of the inserting shaft is provided with a limiting block for preventing separation between the inserting shaft and the elliptical groove.

In an embodiment, the bracket is configured as a plastic bracket, and the conductive elastic piece and the plastic bracket are configured as an injection molded integrated structure.

In an embodiment, two ends of the coil are respectively wound and connected to the conductive elastic piece.

In an embodiment, the housing includes a bottom housing and a cover plate; the bottom housing is provided with a plurality of buckle slots; and the cover plate is provided with buckle points correspondingly clamped with the buckle slots.

The beneficial effect of the present application is that it improves the structure of the existing infrared automatic switching light filter with wireless power supply. The power supply mode of the electromagnetic power mechanism cancels the traditional connection mode through the power cord. By installing the conductive elastic piece on the bracket, the conductive elastic piece is connected to the coil. The conductive elastic piece is in contact with the external power supply apparatus, and the conductive elastic piece is provided with the protrusion, which simplifies the structure and ensures the stability of the connection between the electromagnetic power mechanism and the external power supply apparatus, thus avoiding the problem that the light filter cannot be used due to the poor contact.

BRIEF DESCRIPTION OF THE DRAWINGS

In order to illustrate the technical solutions in the embodiments of the present application or in the related art more clearly, the following briefly introduces the accompanying drawings required for the description of the embodiments or the related art. Obviously, the drawings in the following description are only part of embodiments of the present application. For those skilled in the art, other drawings can also be obtained according to the structures shown in these drawings without any creative effort.

The realization of the objective, functional characteristics, and advantages of the present application are further described with reference to the accompanying drawings.

DETAILED DESCRIPTION OF THE EMBODIMENTS

The technical solutions of the embodiments of the present application will be described in more detail below with reference to the accompanying drawings. It is obvious that the embodiments to be described are only some rather than all of the embodiments of the present application. All other embodiments obtained by those skilled in the art based on the embodiments of the present application without creative efforts shall fall within the scope of the present application.

It should be noted that if there are directional indications, such as up, down, left, right, front, back, etc., involved in the embodiments of the present application, the directional indications are only used to explain a certain posture as shown in the accompanying drawings. If the specific posture changes, the directional indication also changes accordingly.

In addition, if there are descriptions related to "first", "second", etc. in the embodiments of the present application, the descriptions of "first", "second", etc. are only for the purpose of description, and should not be construed as indicating or implying relative importance or implicitly indicates the number of technical features indicated. Thus, a feature delimited with "first", "second" may expressly or implicitly include at least one of that feature. Besides, the meaning of "and/or" appearing in the application includes three parallel scenarios. For example, "A and/or B" includes only A, or only B, or both A and B. In addition, the technical solutions between the various embodiments can be combined with each other, but must be based on the realization by those skilled in the art. When the combination of technical solutions is contradictory or cannot be realized, it should be considered that the combination of such technical solutions does not exist or fall within the scope of protection claimed in the present application.

Figure 1:
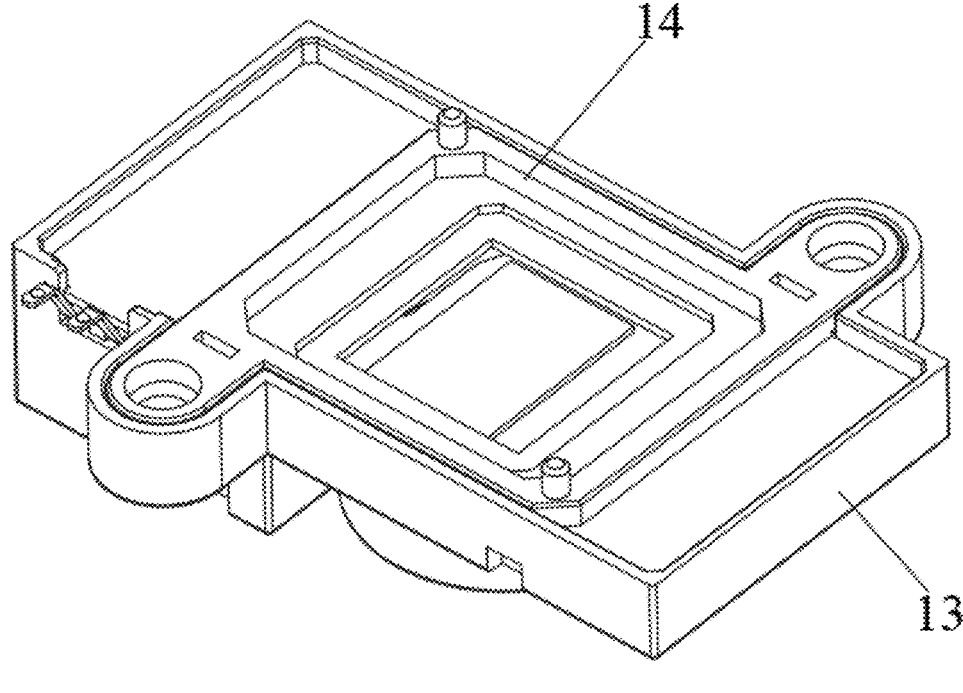
FIG. 1 is a schematic view of an overall structure of a light filter of the present application.
Figure 2:
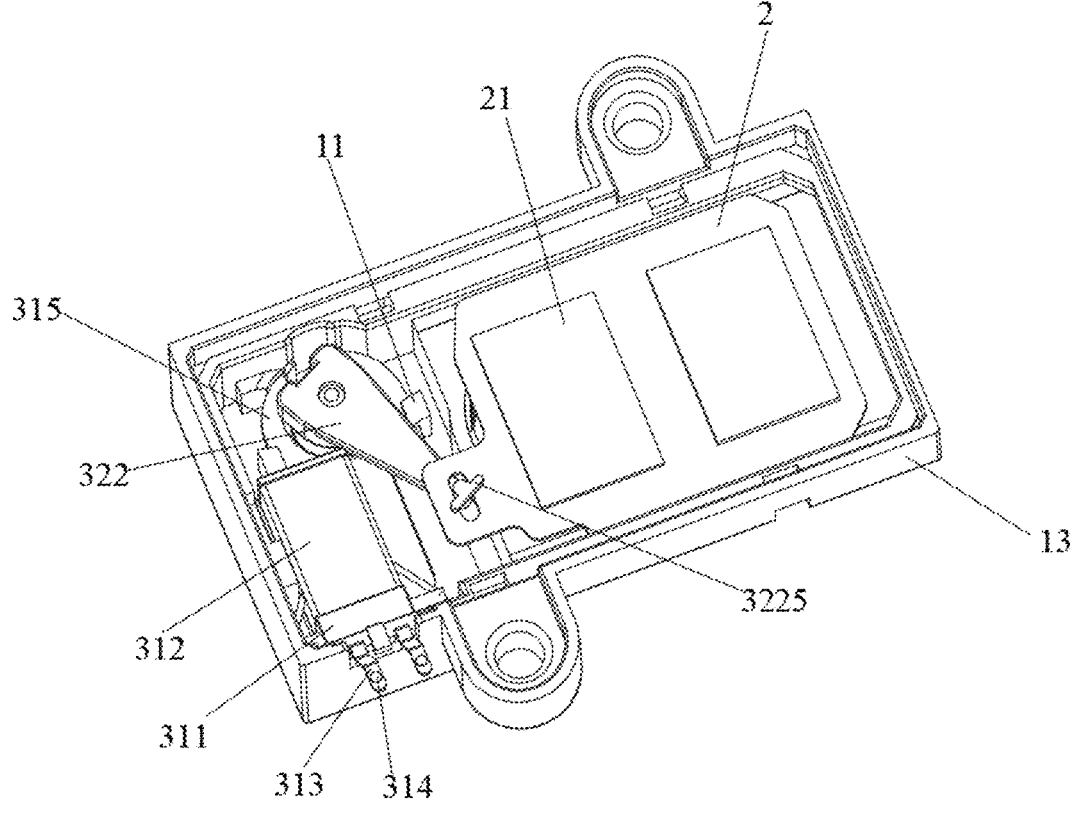
FIG. 2 is a schematic view of an internal installation structure of the light filter in the present application.
Figure 3:
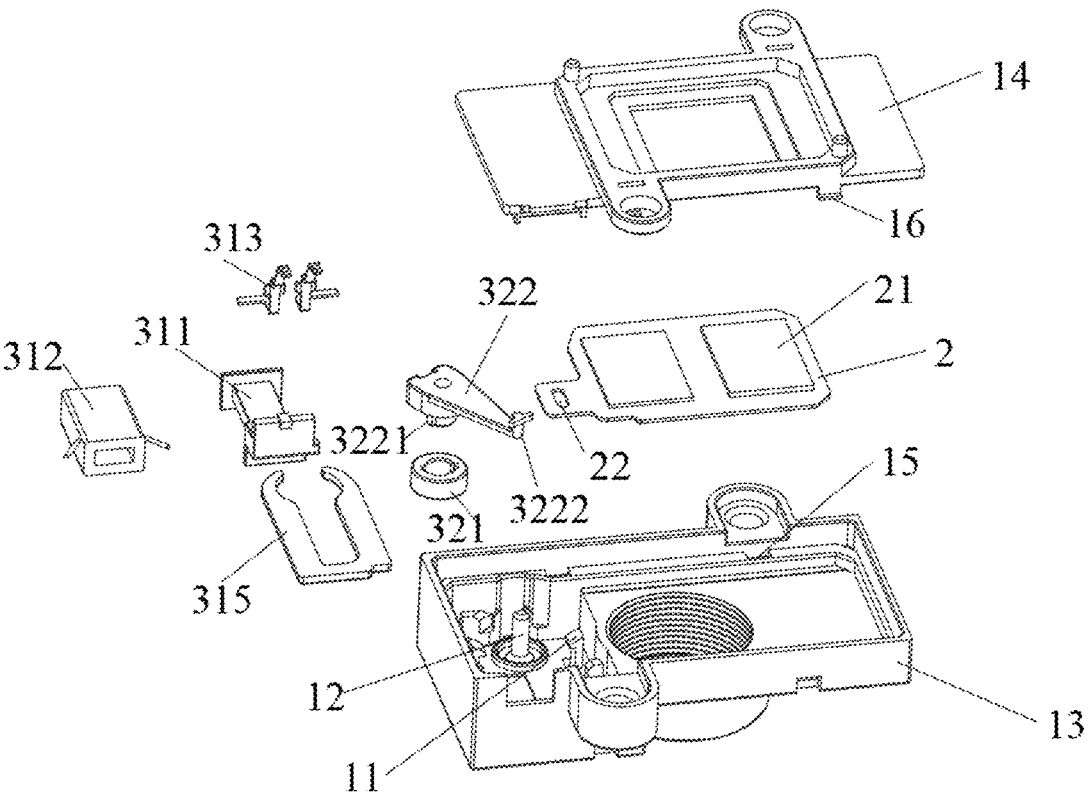
FIG. 3 is an exploded view of the overall structure of the light filter of the present application.
Figure 4:
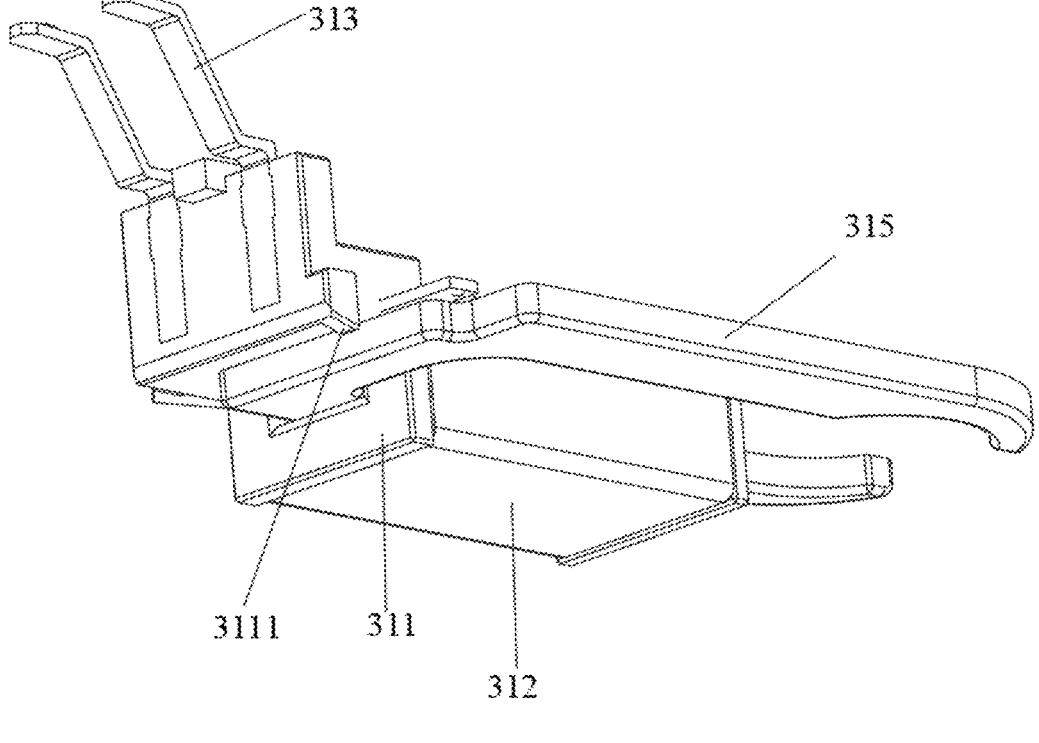
FIG. 4 is a schematic structural view of an electromagnetic power mechanism of the present application.
Figure 5:
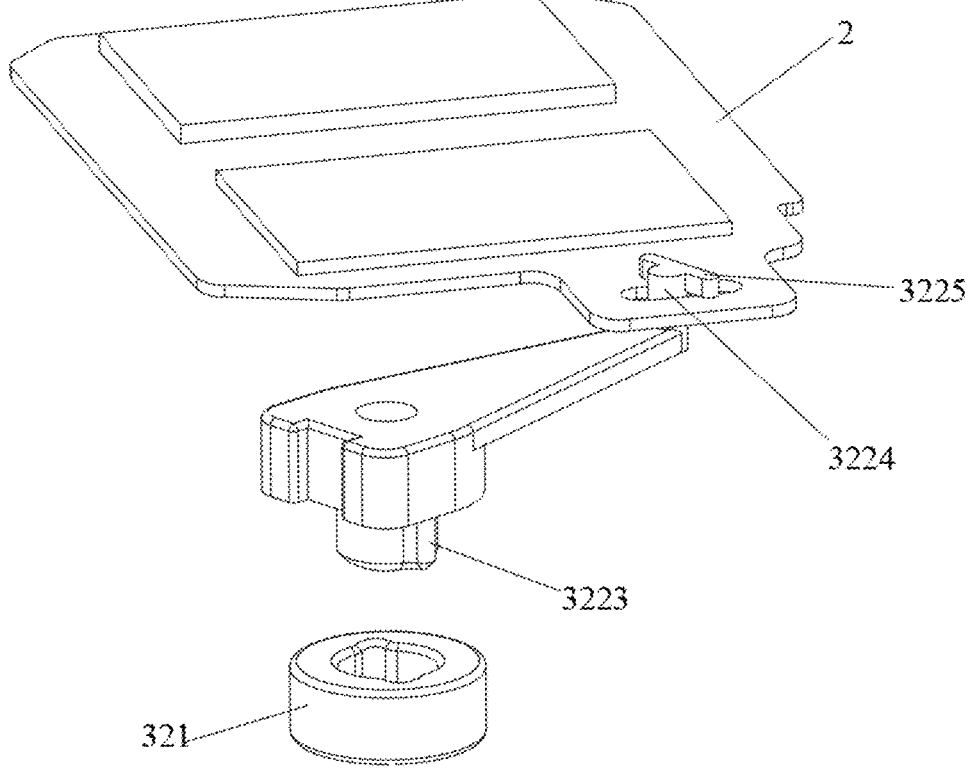
FIG. 5 is a schematic structural view of a transmission mechanism of the application.

An embodiment of the present application provides an infrared automatic switching light filter with wireless power supply, referring to FIG. 1 to FIG. 3, including: a housing, a light filter carrier plate 2, and a driving mechanism.

The light filter carrier plate 2 is slidably installed in the housing, and at least two light filter pieces 21 are installed on the light filter carrier plate 2 along its sliding direction.

The driving mechanism is configured to drive the light filter carrier plate 2 to slide; and the driving mechanism includes an electromagnetic power mechanism and a transmission mechanism.

The electromagnetic power mechanism includes a bracket 311. A coil 312 is wound around the outer side of the bracket 311 along its axial direction. The bracket 311 is provided with conductive elastic pieces 313 respectively connected to both ends of the coil 312. The end portions of the conductive elastic piece 313 are respectively provided with protrusions 314 that are in contact with the external power supply apparatus. The electromagnetic power mechanism also includes a U-shaped magnetic conductive member 315, and the U-shaped magnetic conductive member 315 is penetrated through the bracket 311.

The transmission mechanism includes a rotary magnetic member 321 provided between two ends of the U-shaped magnetic conductive member 315. The transmission mechanism also includes a swing arm 322. One end of the swing arm 322 is connected to the rotary magnetic member 321, and the other end of the swing arm 322 is connected to the light filter carrier plate 2.

It should be noted that this embodiment cancels the traditional way of powering the light filter through the power cord, and sets two conductive elastic pieces 313 on the bracket 311 to connect to the coil 312. When the light filter is powered, two conductive elastic pieces 313 are directly elastically abutted against and are conductive with the external power supply apparatus (usually a printed circuit board (PCB)), which simplifies the structure and ensures the connection stability between the two, greatly reduces the risk of manually operating the power line connection, avoids false soldering, fake soldering or loosening of the power cord terminal, and ensures the normal use of the light filter.

Further, in this embodiment, the bracket 311 is configured as a plastic bracket 311 to ensure the overall insulation performance. The conductive elastic piece 313 and the plastic bracket 311 are configured as an injection molded integrated structure, which simplifies the manufacturing process, facilitates assembly by operators, and improves assembly efficiency. At the same time, in this embodiment, the two conductive elastic pieces 313 are respectively provided with protrusions 314 at positions contacting the contacts on the PCB board. The protrusions 314 are in a hemispherical structure to facilitate contact with the contacts on the PCB board, ensuring a tight fit at the joints. Further, both ends of the coil 312 are respectively wound and connected to the conductive elastic piece 313. In the specific production process, the winding can be completed by an automatic winding machine, which has a high effect and a stable structure.

Further, the U-shaped magnetic conductive member 315 includes a first arm and a second arm. The bracket 311 is provided with a through hole for the first arm or the second arm to pass through. A clamping slot 3111 is provided outside the bracket 311 for clamping the U-shaped magnetic conductive member 315. In this embodiment, the U-shaped magnetic conductive member 315 is inserted into the bracket 311. When the elastic piece is energized with the external power supply apparatus, the coil 312 acts to generate a magnetic field on the U-shaped magnetic conductive member to drive the transmission mechanism to move. The U-shaped magnetic conductive member 315 has a U-shaped structure and is inserted in the axial direction of the bracket 311. The two form a whole with a stable structure, and the U-shaped magnetic conductive member 315 is further tightly clamped by the clamping slot 3111 outside the bracket 311, which ensures the installation stability between the two.

Further, a plurality of clamping buckles 11 clamped with the first arm and the second arm are provided in the housing. In this embodiment, the plurality of clamping buckles 11 are provided in the housing. When the electromagnetic power mechanism is installed in the housing, the clamping buckle 11 compresses the first arm and second arm to ensure that the electromagnetic power mechanism is stably installed in the housing to prevent it from loosening or affecting the normal use of the light filter.

Further, the rotary magnetic member 321 is configured as a cylindrical magnet. The cylindrical magnet is provided between the end portions of the first arm and the second arm. The inner sides of the end portions of the first arm and the second arm are arc surfaces adapted to the outside of the cylindrical magnet. In this embodiment, the cylindrical magnet is provided between the first arm and the second arm, and is wrapped by two arc surfaces inside the end portions of the two arms. When the first arm and the second arm generate magnetic fields, the cylindrical magnet can be driven to rotate.

Further, a fixed shaft 12 is provided in the housing, the axis center of the cylindrical magnet is inserted into the fixed shaft 12, and the cylindrical magnet can rotate around the fixed shaft 12. When the cylindrical magnet is acted by the magnetic field of the first arm and the second arm, the fixed shaft 12 can make the cylindrical magnet rotate forward and backward around it, thereby driving the swing arm 322 to swing back and forth.

Further, one end of the swing arm 322 is provided with an inserting portion 3221 inserted into the axis center of the cylindrical magnet. The inserting portion 3221 is in a cylindrical structure, and a semicircular bump 3223 is provided outside the inserting portion 3221. In this embodiment, the semicircular bump 3223 is added to the inserting portion 3221 of the swing arm 322, which can prevent relative rotation between the swing arm 322 and the cylindrical magnet, so that the rotational force of the cylindrical magnet can be stably transmitted directly to the swing arm 322 to drive the swing arm 322 to swing.

Further, the other end of the swing arm 322 is provided with a hinge portion 3222 hinged with the light filter carrier plate 2. The light filter carrier plate 2 is provided with an elliptical groove 22, and the hinge portion 3222 is provided with an inserting shaft 3224 inserted into the elliptical groove 22. The end portion of the inserting shaft 3224 is provided with a limiting block 3225 for preventing separation between the inserting shaft 3224 and the elliptical groove 22. When the swing arm 322 swings, since the light filter carrier plate 2 can only slide along one direction in the housing, the inserting shaft 3224 can slide in the elliptical groove 22 of the light filter carrier plate 2 to drive the light filter carrier plate 2 to slide in the housing, so as to drive the light filter piece 21 to switch positions. In this embodiment, the limiting block 3225 is provided at the end portion of the inserting shaft 3224, which can effectively prevent loosening between the swing arm 322 and the light filter piece 21 and ensure the stability of the power transmission process.

Further, the housing includes a bottom housing 13 and a cover plate 14. The bottom housing 13 is provided with a number of buckle slots 15, and the cover plate 14 is provided with buckle points 16 corresponding to the clamped buckle slots 15. The bottom housing 13 is engaged with the cover plate 14 through the buckle slot 15 and the buckle point 16, which facilitates the fixation and disassembly of the two and ensures the stability of the housing structure at the same time.

The above descriptions are only embodiments of the present application, and are not intended to limit the scope of the present application. Under the inventive concept of the present application, any equivalent structural transformations made by using the contents of the description and drawings of the present application, or direct/indirect applications in other related technical fields are included in the scope of the present application.

What is claimed is:

1. An infrared automatic switching light filter with wireless power supply, comprising:
   a housing;
   a light filter carrier plate slidably provided in the housing, wherein at least two light filter pieces are provided on the light filter carrier plate along a sliding direction of the light filter carrier plate; and
   a driving mechanism configured to drive the light filter carrier plate to slide, wherein the driving mechanism comprises an electromagnetic power mechanism and a transmission mechanism;
   wherein the electromagnetic power mechanism comprises a bracket; a coil is wound around outside the bracket along an axial direction of the bracket; the bracket is provided with conductive elastic pieces respectively connected to both ends of the coil; end portions of the conductive elastic piece are respectively provided with protrusion in contact with and connected to an external power supply apparatus; the electromagnetic power mechanism further comprises a U-shaped magnetic conductive member penetrated through the bracket; and
   the transmission mechanism comprises a rotary magnetic member provided between two ends of the U-shaped magnetic conductive member, and the transmission mechanism further comprises a swing arm; one end of the swing arm is connected to the rotary magnetic member, and the other end of the swing arm is connected to the light filter carrier plate.

2. The infrared automatic switching light filter with wireless power supply according to claim 1, wherein the U-shaped magnetic conductive member comprises a first arm and a second arm;
   the bracket is provided with a through hole for the first arm or the second arm to pass through; and
   a clamping slot is provided outside the bracket and configured to tightly clamp the U-shaped magnetic conductive member.

3. The infrared automatic switching light filter with wireless power supply according to claim 2, wherein a plurality of clamping buckles clamped with the first arm and the second arm are provided in the housing.

4. The infrared automatic switching light filter with wireless power supply according to claim 2, wherein the rotary magnetic member is a cylindrical magnet provided between an end portion of the first arm and an end portion of the second arm; and
   an inner side of the end portion of the first arm and an inner side of the end portion of the second arm are arc surfaces adapted to an outside of the cylindrical magnet.

5. The infrared automatic switching light filter with wireless power supply according to claim 4, wherein a fixed shaft is provided in the housing, and an axis center of the cylindrical magnet is inserted into the fixed shaft; and
   the cylindrical magnet is configured to rotate around the fixed shaft.

6. The infrared automatic switching light filter with wireless power supply according to claim 4, wherein one end of the swing arm is provided with an inserting portion inserted into the axis center of the cylindrical magnet, and the inserting portion is in a cylindrical structure; and
   a semicircular bump is provided outside the inserting portion.

7

7. The infrared automatic switching light filter with wireless power supply according to claim 6, wherein the other end of the swing arm is provided with a hinge portion hinged to the light filter carrier plate;

the light filter carrier plate is provided with an elliptical groove, and the hinge portion is provided with an inserting shaft inserted into the elliptical groove; and an end portion of the inserting shaft is provided with a limiting block for preventing separation between the inserting shaft and the elliptical groove.

8. The infrared automatic switching light filter with wireless power supply according to claim 1, wherein the bracket is configured as a plastic bracket, and the conductive elastic piece and the plastic bracket are configured as an injection molded integrated structure.

9. The infrared automatic switching light filter with wireless power supply according to claim 1, wherein two ends of the coil are respectively wound and connected to the conductive elastic piece.

10. The infrared automatic switching light filter with wireless power supply according to claim 1, wherein the housing comprises a bottom housing and a cover plate;

the bottom housing is provided with a plurality of buckle slots; and the cover plate is provided with buckle points correspondingly clamped with the buckle slots.

\* \* \* \* \*